(12) United States Patent
Capoia et al.

(10) Patent No.: US 11,620,591 B2
(45) Date of Patent: Apr. 4, 2023

(54) METHOD AND SYSTEM FOR OPTIMIZED POSITIONING OF ITEMS IN AT LEAST ONE BOX

(71) Applicant: Panotec S.r.l., Cimadolmo (IT)

(72) Inventors: Giuseppe Capoia, Cimadolmo (IT); Luigi De Giovanni, Padua (IT)

(*) Notice: Subject to any disclaimer, the term of this patent is extended or adjusted under 35 U.S.C. 154(b) by 274 days.

(21) Appl. No.: 16/603,967

(22) PCT Filed: Sep. 4, 2018

(86) PCT No.: PCT/IB2018/056720
§ 371 (c)(1),
(2) Date: Oct. 9, 2019

(87) PCT Pub. No.: WO2019/043661
PCT Pub. Date: Mar. 7, 2019

(65) Prior Publication Data
US 2020/0193336 A1 Jun. 18, 2020

(30) Foreign Application Priority Data
Sep. 4, 2017 (IT) .......................... 102017000098767

(51) Int. Cl.
*G06Q 10/04* (2023.01)
*G06Q 10/083* (2023.01)

(52) U.S. Cl.
CPC ......... *G06Q 10/043* (2013.01); *G06Q 10/083* (2013.01)

(58) Field of Classification Search
CPC .................. G06Q 10/043; G06Q 10/083
See application file for complete search history.

(56) References Cited

U.S. PATENT DOCUMENTS 9,457,970 B1 10/2016 Zevenberger
9,914,278 B2 * 3/2018 Pettersson ............. B31B 50/006
(Continued)

FOREIGN PATENT DOCUMENTS

EP 3147838 3/2017
WO 2004113030 12/2004

OTHER PUBLICATIONS

Wu, Shuohao, Kay, Michael, King, Russell, Vila-Parrish, Anita, and Warsing, Donald, "Multi-objective Optimization of 3D Packing Problem in Additive Manufacturing," IIE Annual Conference Proceedings, Institute of Industrial and Systems Engineers (IISE), 1485-1494 (2014).*

(Continued)

Primary Examiner — Nathan Erb
(74) Attorney, Agent, or Firm — Themis Law

(57) ABSTRACT

A method for positioning items in a box includes providing a list of items, a list of boxes, dimensional data for each item, position-restricting data for each item, a system for assembling the boxes, a system for placing each item into a main box, a control unit connected having an algorithm for selecting the box and how the items are introduced into the box; and applying the algorithm to select a main box having a minimum size sufficient to contain the items and minimize empty space, and to determine order of introduction, position and rotation of the items; and applying the algorithm to the placing system. Applying the algorithm includes calculating the contact surface areas of each item to maintain the contact surface area above a minimum threshold, thereby ensuring stable positioning and reducing the volume of the filler. A system for positioning items in a box.

9 Claims, 2 Drawing Sheets

(56) References Cited

U.S. PATENT DOCUMENTS

| | | | | |
|---|---|---|---|---|
| 10,518,473 B2* | 12/2019 | Huang | ............... | B33Y 50/00 |
| 10,745,164 B2* | 8/2020 | Prahlad | ............. | G06Q 30/0635 |
| 10,807,746 B2* | 10/2020 | Moncrief | ............... | B65B 5/024 |
| 2003/0200111 A1* | 10/2003 | Damji | ............. | G06Q 10/08345 |
| | | | | 705/335 |
| 2008/0020916 A1 | 1/2008 | Magnell | | |
| 2014/0067104 A1* | 3/2014 | Osterhout | ............. | G06Q 50/28 |
| | | | | 703/1 |
| 2014/0336027 A1 | 11/2014 | Kulkarni | | |
| 2019/0009490 A1* | 1/2019 | Suokas | ................... | B65D 5/36 |

OTHER PUBLICATIONS

Silvano Martello et al.: "The Three-Dimensional Bin Packing Problem", Operations Research., vol. 48, to. 2, Apr. 1, 2000 (Apr. 1, 2000), pp. 256-267, XP055470654, US ISSN: 0030-364X, DOI: 10.1287/ppre.48.2.256.12386 p. 1-p. 3.
Wu Y et al: "Three-dimensional bin packing problem with variable bin height", European Journal of Dperational Research, Elsevier, Amsterdam, NL, vol. 202, No. 2, Apr. 16, 2010 (Apr. 16, 2010), pp. 347-355, XP026697164, ISSN: 0377-2217, DOI: 10.1016/J.EJOR. 2009.05.040 [retrieved on Jun. 23, 2009] p. 2-p. 2 p. 7-p. 8.
Haoyuan Hu et al: "Solving a New 3D Bin Packing Problem with Deep Reinforcement Learning Method", Aug. 19, 2017 (Aug. 19, 2017), XP055470636, Retrieved from the Internet: URL:https://arxiv.org/pdf/1708.05930.pdf [retrieved on Apr. 25, 2018] the whole document.

* cited by examiner

METHOD AND SYSTEM FOR OPTIMIZED POSITIONING OF ITEMS IN AT LEAST ONE BOX

FIELD OF THE INVENTION

The present invention generally finds application in the field of fabrication of box-like packing containers and particularly relates to a method of optimized positioning of items in at least one box.

The invention also relates to a system for carrying out the above optimized positioning method.

BACKGROUND ART

Methods have been long known in the field of the package production for solving "bin packing" problems using computer products that comprise an algorithm for optimizing the volumes of the item-containing boxes.

These methods generally include a step of mathematically determining a minimum number of boxes having the same size, and adapted to contain a predetermined number of items without exceeding the box size and without causing interpenetration of items.

Namely, once a list of items to be inserted into a box and the box size have been determined, volume optimization has the purpose of minimizing the space that is not occupied by the items by defining the order in which the latter are introduced into the box.

Generally, these algorithms include exact computation methods which provide a unique best-fit order. Nevertheless, these algorithms have a considerable computational cost due to long computation times and implement programming libraries that use domain-specific languages.

In an attempt to at least partially obviate these drawbacks, methods have been developed that use heuristic algorithms, which do not provide an optimal solution, but offer acceptable solutions in reasonable times, using highly flexible computational features, that can be adapted to a plurality of data and restriction situations.

U.S. Pat. No. 6,876,958 discloses a method of optimizing volumes and sequences of placement of items in a plurality of boxes by means of a first step of reading geometric and dimensional data of the items and restriction data for item placement in the boxes.

The method further includes a second step of determining the best box selected from a list of available boxes and a later step of calculating the number of boxes required to contain the items.

The geometric and dimensional data of the items comprise the three-dimensional dimensions, the weight and a number of placement restrictions, including the possibility to fit in a box only on top of other items to prevent damage.

A first drawback of this known method is that the boxes selected to contain the items of the list have the same size. Also, a box whose size is not included in the list of available boxes cannot be used.

Another drawback of this method is that the process does not minimize the space that is not occupied by the items but provides the same minimum empty space for every box in use.

In an attempt to at least partially obviate these drawbacks, methods and systems have been developed for making customized boxes based on the list of items to be packed.

US20140336027 discloses a method of making customized boxes by calculating the volume occupied by loose items contained in a predetermined list.

This method includes a step of forming boxes whose size is suitable to contain the overall volume of the items and a step of calculating the overall volume value by the summation of the volumes of all the items and transmission of such value to box assembling means.

A first drawback of this method is that it does not ensure minimization of the volume that is not occupied by the items, but only the creation of a box adapted to contain the items and having inner walls adhering to the items.

A further drawback of this method is that the items are not automatically arranged in the box, but require the presence of an operator that would manually place the items in the box.

Another drawback of this method is that it does not ensure minimization of the filling material that is required to reduce the risk of damage to the items in the box.

Technical Problem

In the light of the prior art, the technical problem addressed by the present invention is to provide packing boxes for containing items while optimizing the unoccupied volume and improving the stability of the items in the box.

DISCLOSURE OF THE INVENTION

The object of the present invention is to obviate the above discussed drawback, by providing a method and a system for optimized positioning o items in at least one box, that is highly efficient and relatively cost-effective.

A particular object of the present invention is to solve the above technical problem by means of a method and a system as discussed hereinabove that can provide customized boxes having optimized centroids and can minimize empty spaces therein.

Another object of the present invention is to provide a method and a system as discussed hereinabove that can minimize the overall volume of the box.

A further object of the present invention is to provide a method and a system as discussed hereinabove that can afford a highly flexible selection of the box to be filled, irrespective of the shape and size of the items.

Another object of the present invention is to provide a method and a system as discussed hereinabove that reduces computation times.

Yet another object of the present invention is to provide a method and a system as discussed hereinabove that can handle any kind of position restriction for the items in the box.

These and other objects, as more clearly explained hereinafter, are fulfilled by a method of optimized positioning of the items in at least one box, as defined in the independent claim 1, which method comprises the steps of a) providing a first list of items to be packed, of b) providing a second list of boxes designed to contain one or more items of the first list with the interposition of a suitable filling material, c) providing a first set of geometric and dimensional data for each item of the first list and a step of d) providing a second set of position restricting data which restrict the positioning of each item in at least one of the boxes of the second list.

The method further comprises a step of f) providing mechanical means for assembling one or more boxes of the second list, g) providing positioning means for placing each item of the first list in at least one main box of the second list, h) providing a computerized control unit connected to the positioning means and the assembling means and having a memory unit in which is loaded at least one first algorithm for optimizing the selection of the box and the way of introducing the items into the box and i) applying the first algorithm to select at least one main box of the second list, having the minimum size to contain the items of the first list, while minimizing the unoccupied empty space, and to determine the order of introduction, position and rotation of the items of the first list in the selected box according to the first and the second sets of data and a step of j) applying the first algorithm for actuating the assembling means to form the at least one box and the positioning means for introducing the items of the first list into the selected and assembled box.

Namely, the step h) of the method comprises a step of j) calculating, by means of the first algorithm, the contact surface area of each item with those next to it, or with the inner surface of the box, to maintain the contact surface area above a minimum threshold in view of ensuring stable positioning and reducing the volume of the filling material.

In a further aspect, the invention relates to a system for optimized positioning of items, as defined in claim 10.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a method and a system for optimized positioning of items in at least one box, which is described as a non-limiting example with the help of the annexed drawings, in which.

DETAILED DESCRIPTION OF A PREFERRED EXEMPLARY EMBODIMENT

Figure 1:
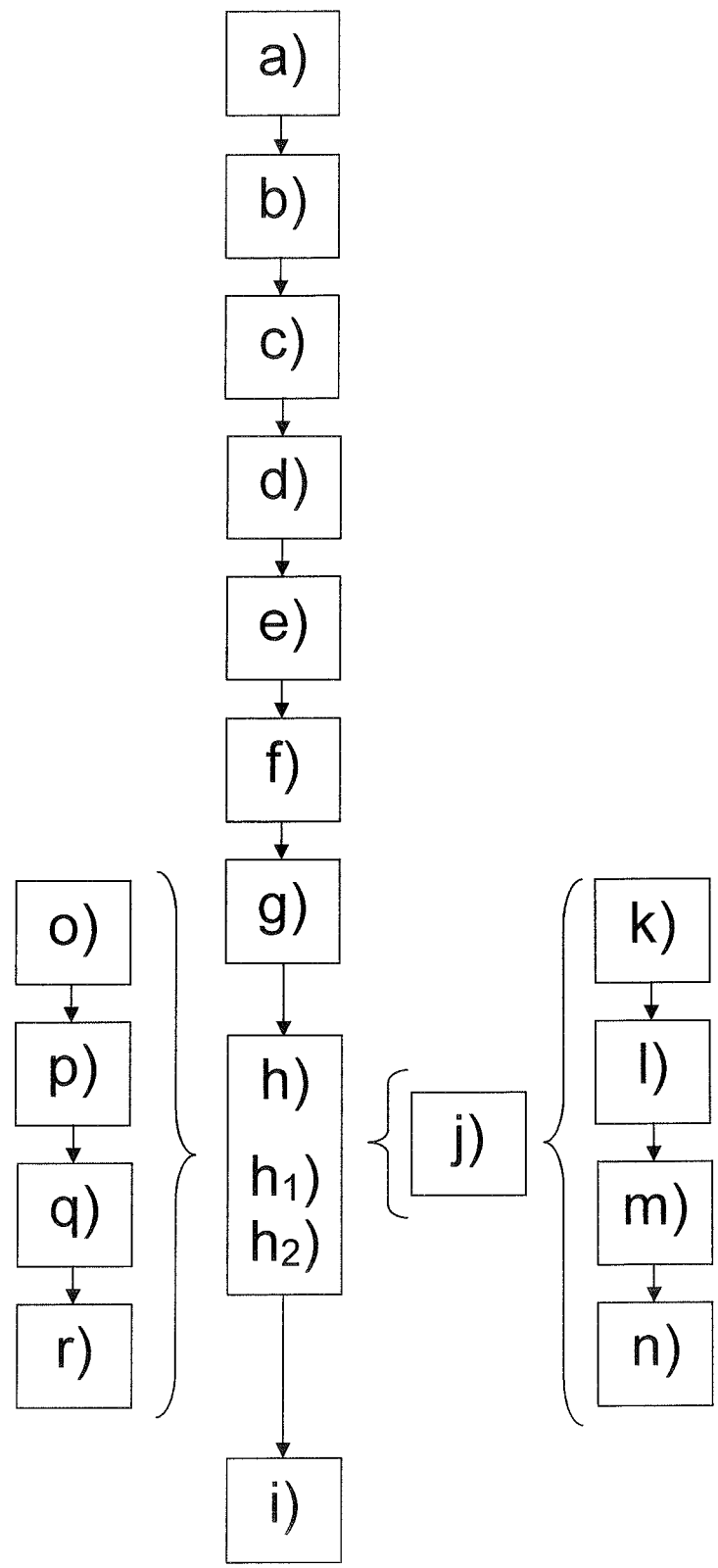
FIG. 1 is a diagrammatic view of the method of the invention.

Particularly referring to the figures, there are shown a method and a system, generally designated by numeral 1, for optimized positioning of items O in at least one box B.

The method comprises a step of a) providing a first list L1 of items O1, O2, O3, . . . to be packed and a step of b) providing a second list L2 of boxes B1, B2, B3, . . . designed to contain one or more items of the first list L1 with the interposition of a suitable filling material R to prevent the items O from being damaged during transport.

By way of example, the first list L1 of items O may be a list of a plurality of items O1, O2, O3, . . . to be introduced into one or more boxes B1, B2, B3, . . . of the second list L2, which may have different sizes and features and be adapted to be transported in a means of transport.

Furthermore, the filling material R may be of a different type depending on requirements and may include high- or low-density loose polystyrene foam chips, air-bubble elements or pluriball layers or other equivalent types.

The method further comprises a step of c) providing a first set of geometric and dimensional data D' for each item O of the first list L1 and a step of d) providing a second set of position restricting data D" that restrict the positioning of each item O in at least one of the boxes B of the second list L2.

Namely, the first set of data D' may include the three-dimensional dimensions and the weight of each item O and the second set of data D" may include restrictions to the three-dimensional rotation and to the possibility to place the items O underneath or on top of other items O.

For example, the first list L1 may include items that may be only positioned by two-dimensional rotation or items or that may be placed only on top of other items O, with their top surface free.

The method further comprises a step of e) providing mechanical means 2 of an optimized positioning system 1, which are adapted to assemble one or more boxes B of the second list L2.

A step is also envisaged of f) providing positioning means 3, which are also part of the positioning system 1 and are adapted to place each item O1, O2, O3, . . . . Of the first list L1 in at least one main box BP of the second list L2.

The assembling means 2 can cut, crease and glue a cardboard sheet having predetermined characteristics and automatically form in an automatic manner the box B according to the information contained in the second list L2.

The internal cavity of the box B can be later filled by the positioning means 3 which may alternatively be of the belt conveyor type or of the robotic arm type.

The method comprises a step of g) providing a computerized control unit 4 connected to the positioning means 3 and to the assembling means 2 and having a memory unit 5 in which is loaded a first algorithm 6 for optimizing the selection of the box B and the way of introducing the items O into the box B.

The method comprises a step of h) applying the first algorithm 6 to select at least one main box BP of the second list L2, having a minimum size to contain the items O of the first list L1, while minimizing the unoccupied empty space, and to determine the order of introduction, the position and rotation the items O of the first list L1 in the selected box B according to the first D' and second D" sets of data.

Then, this first algorithm 6 allows a so-called "Best Select" optimization, to select a box B that can contain the items O considering a plurality of possible fixed dimensions for the boxes B.

Figure 2:
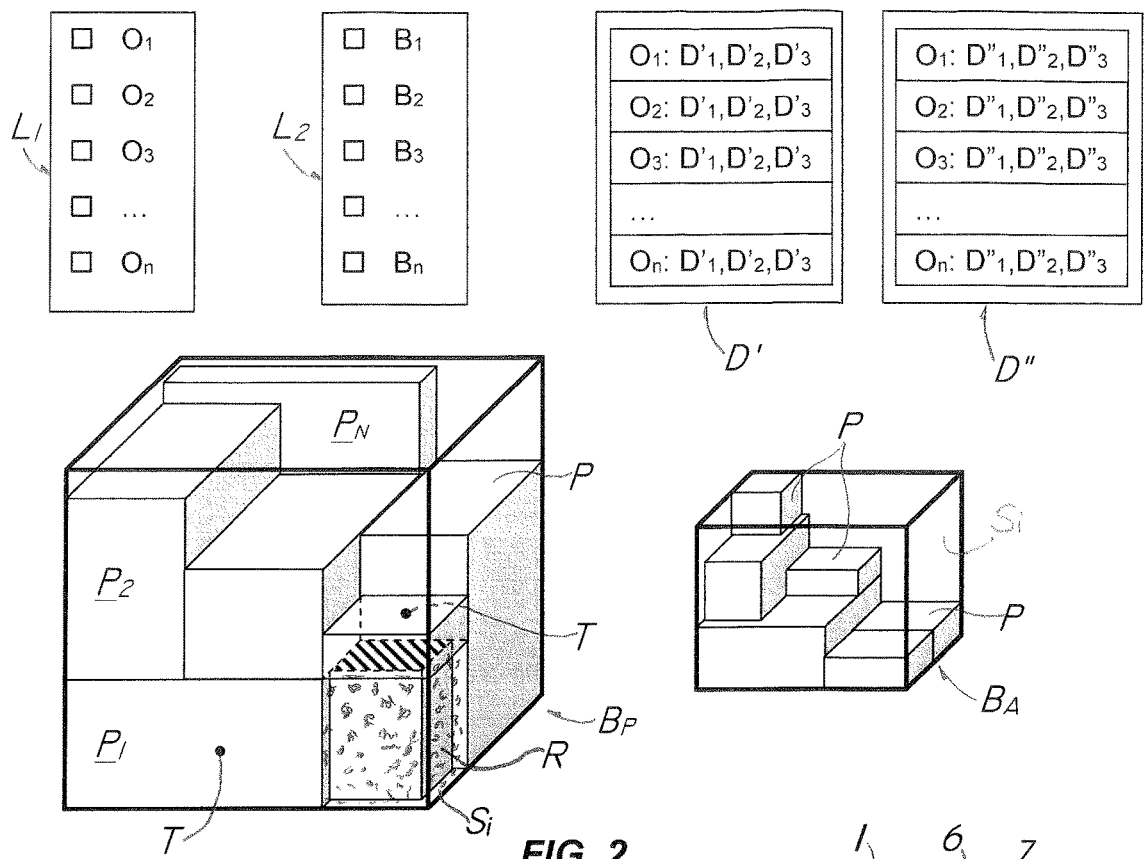
FIG. 2 is a diagrammatic view of a pair of boxes filled with a plurality of items with the method of the invention.

As shown in FIG. 2, the first optimization algorithm 6 may include a step of h1) assembling at least one additional box BA if the order of introduction does not allow introduction of all the items O of the first list L1 in the selected main box BP.

The first algorithm 6 may further include an additional step h2) of minimizing the overall volume of the items O excluded from insertion in the selected main box BP and introducing them into the additional box B.

For example, if the first list L1 contains a plurality of items O having different sizes, priority will be given to introducing larger items O into the main box BP and the remaining smaller items into the additional box BA.

The method 1 also includes a step of i) applying the first algorithm 6 for actuating the assembling means 2 to form at least the main box BP and the positioning means 3 for introducing the items O of the first list L1 into the selected and assembled box B.

In a peculiar aspect of the invention, the step h) comprises a step of j) calculating, by means of the first algorithm 6, the contact surface area Sc of each item O with those next to it, or with the inner surface Si of the box B, to maintain the contact surface area Sc above a minimum threshold Sm in view of ensuring stable positioning and reducing the volume of the filling material R.

With the calculation step j), the method ensures stable positioning and reduction of the volume of the filling material R for each possible order of introduction, thereby affording compaction of the selected box B.

Figure 3:
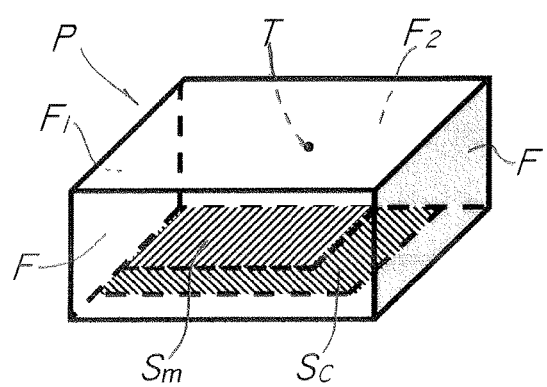
FIG. 3 schematically shows a detail of the method of FIG. 1.

As shown in FIG. 3, the first algorithm 6 may include initial determination of the value of the minimum threshold Sm and the latter may range from a minimum contact surface area Sc of 50% to a maximum of 100%, preferably 75%.

The calculation step j) by the first algorithm 6 may comprise a substep of k) defining a virtual parallelepiped P1, P2, P3, . . . that may be associated with each item O1, O2, OR3, . . . and determining its dimensions and a sub-step l) of calculating the surface area of each face F of the virtual parallelepiped P1, P2, P3, . . . and determining the faces F whose dimensions are greater than the minimum threshold SM.

With these substeps the method will afford linearization of the shape of each item O into a corresponding virtual parallelepiped P whose three-dimensional dimensions correspond to the maximum size of each item O.

This will allow the method to facilitate measurement of the faces F that can be used for each item O to lean against those next to it, or against the inner surface Si of the box B.

The calculation step j) by the first algorithm 6 may comprise a substep m) of determining a random order of insertion of the virtual parallelepipeds P1, P2, P3, . . . and a substep of n) determining the salient point T of each box B by randomized iteration.

Preferably, such salient point T of each virtual parallelepiped P1, P2, P3, . . . corresponds to the point at which the contact surface SC and two vertical faces F1, F2 of the corresponding virtual parallelepiped P1 contact a parallelepiped P2 next to it or the inner surface Si of the box B.

Alternatively, the salient point T may be determined by the "wall-building" method, in which only the faces F of the virtual parallelepiped P are considered as contact surfaces Sc, or the "corner point" is considered, with the relevant salient point T being selected from the vertices of the virtual parallelepiped P.

Namely, the substep n) may iteratively determine a possible placement in a salient point T of a parallelepiped P by identifying the possible contact with the previously introduced parallelepipeds P and may calculate, for all admitted placements, all the new salient points T of the virtually introduced parallelepipeds P.

This calculation may be performed by suitable geometric projections of the salient points T of the virtual parallelepiped P associated with each item O, for example by rotating it along each axis, on all the virtual parallelepipeds P1, P2, P3 of the items O1, O2, O3, . . . that have been already introduced in the box B and on all the inner walls of the latter.

Thus, the substep n) prevents to push an item from being further pushed either toward those that have been previously inserted or toward the inner walls of the box B.

As shown in FIG. 1, the step h) of applying the first algorithm 6 comprises the substep o) of calculating an index of adhesion of the virtual parallelepiped P to the box B, which is defined as the maximum value of the weighted sum of the contact surface area Sc of the virtual parallelepiped P associated with each item P.

As is known in the art, the weighted sum is a calculation which is used to establish conditioning parameters to determine an objective and a weight is assigned to each conditioning parameter according to the importance that the parameter has for the achievement of the objective.

After the calculation substep o) calculation, a substep may be provided of p) simulating the iterative introduction of each of the virtual parallelepipeds P1, P2, P3, . . . into the box B based on the different possible orders of introduction for a number of times with respect to a predetermined parameter and of q) associating each possible introduction with a box B having the smallest volume that can contain all the virtual parallelepipeds P1, P2, P3.

The determination of the order of introduction and of the best box B that can contain the items O1, O2, O3, . . . of the first list L1 is obtained by a substep of r) selecting the order of introduction in which the virtual parallelepipeds P1, P2, P3, . . . have a higher adhesion index and the box B has the smallest possible volume.

It will be understood that the substeps of the method of the invention afford selection of a main box BP and an additional box BA having cubic dimensions and an overall center of gravity displaced toward the bottom.

The method 1 may also comprise a second optimization algorithm 7 for determining the dimensions of the main box BP and at least one additional box BA that is not in the second list L2 of boxes B and for later actuating the assembling means 2.

This second algorithm 7 provides a "Best Fit" optimization that calculates the dimensions of the box B to introduce the items O of the first list L1 according to the maximum limits for the three-dimensional dimensions and the total weight of the box B.

Conveniently, if not all the items O of the first list L1 can be introduced into a selected main box BP having such maximum size, the second algorithm 7 may select the dimensions of at least one additional box BA in which the remaining items O will be introduced, while indicating which items will be introduced for each of the boxes B, the order of introduction, the position and rotation of each item O in the box B.

If these maximum dimensional limits do not allow introduction of all the items O of the first list L1 into the main box BP, after the calculation the second algorithm 7 actuates the assembling means 2 to form an additional box BA whose internal dimensions allow it to receive the remaining items O and subsequently actuates the positioning means 3.

Particularly, the second algorithm 7 may determine the dimensions of the main box BP and of the additional box BA by calculating the total volume of the virtual parallelepipeds P1, P2, P3, . . . of each item O1, O2, O3, . . . and identifying one box B whose volume can contain the total volume of the virtual parallelepipeds P1, P2, P3, . . . .

Advantageously, the first 6 and second 7 algorithms may provide packing solutions using heuristic calculations and considering a first list L1 containing 30 objects O1, O2, O3, . . . and, in the case of the first algorithm 6, a second list L2 containing 20 boxes B1, B2, B3, . . . .

The invention also relates to a system 1 for optimized positioning of items O1, O2, O3, . . . of a first list L1 in at least one box B of a second list of boxes L2.

Figure 4:
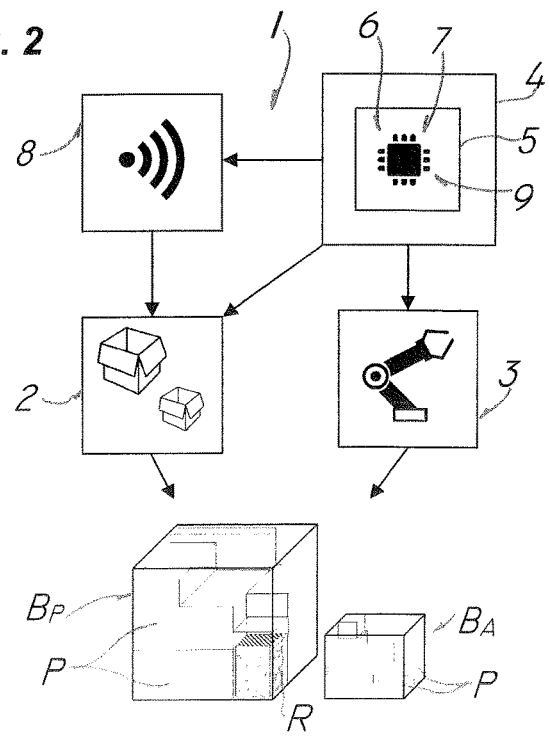
FIG. 4 is a diagrammatic view of the system of the invention.

As shown in FIG. 4, the system 1 comprises detection means 8 for detecting the items O1, O2, O3, . . . of the first list L1 and automated assembling means 2 for assembling boxes B of the second list L2.

Furthermore, the system 1 comprises automated positioning means 3 for positioning one or more items O of the first list L1 in one or more boxes B of the second list L2 and a microprocessor-based control unit 4 operably connected to the detection means 8, the assembling means 2 and the positioning means 3 and having a memory unit 5.

Particularly, the system 1 includes a computer program product 9 loaded in the memory unit 5, and comprising the first 6 and second 7 algorithms and code portions adapted to execute the method as described above.

This computer program product 9 may be implemented with a programming language of the C # type and may be interfaced with the detection means 8, the assembling means 2 and the positioning means 3 by instructions contained in an XML text file.

It will be apparent from the foregoing that the method and system of the invention fulfill the intended objects and can particularly provide packing boxes for containing items while optimizing the unoccupied volume and improving the stability of the items in the box.

The method and system of the invention are susceptible to a number of changes or variants, within the inventive concept disclosed in the appended claims.

While the method and system have been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be manufactured on an industrial scale in factories for processing sheet materials into packages.

The invention claimed is:

1. A method (1) for optimized positioning of items (O) in a box (B), said method comprising the steps of:
   a) providing a first list ($L_1$) of items ($O_1$, $O_2$, $O_3$, ...) to be packed;
   b) providing a second list ($L_2$) of boxes ($B_1$, $B_2$, $B_3$, ...) configured to contain one or more of the items (O) of said first list ($L_1$) with an interposition of a filling material (R);
   c) providing a first set of geometric and dimensional data (D') for each item (O) of said first list ($L_1$);
   d) providing a second set of position restricting data (D") that restrict positioning of each item in a box (B) of said second list ($L_2$);
   e) providing mechanical means (2) for assembling one or more of the boxes (B) of said second list ($L_2$);
   f) providing positioning means (3) for placing each item ($O_1$, $O_2$, $O_3$, ...) of said first list ($L_1$) in at least one main box ($B_P$) of said second list ($L_2$);
   g) providing a computerized control unit (4) connected to said positioning means (3) and to said mechanical means (2) and having a memory unit (5) in which there is loaded a first algorithm (6) configured to optimize a selection of the at least one of the boxes (B) and a way of introducing the items (O) into the box (B);
   h) applying said first algorithm (6) to select the at least one main box ($B_P$) of the second list ($L_2$), having a minimum size to contain the items (O) of the first list ($L_1$), while minimizing an unoccupied empty space, and to determine an order of introduction, the position and rotation of the items (O) of said first list ($L_1$) in the box (B), that has been selected, according to said first (D') and said second (D") sets of data; and
   i) applying said first algorithm (6) for actuating said mechanical means (2) to form said at least one main box ($B_P$) and said positioning means (3) for introducing the items (O) of the first list ($L_1$) into the box (B) that has been selected and assembled wherein said step h) comprises a step of j) of calculating, with said first algorithm (6), contact surface areas ($S_c$) of each item (O) with contact surface areas of one or more items next to the item, or with inner surface ($S_i$) of the box (B) to maintain said contact surface area ($S_c$) of each item above a minimum threshold ($S_m$), thereby ensuring stable positioning and reducing a volume of the filling material (R),
   wherein said step; j) comprises:
   k) defining a virtual parallelepiped ($P_1$, $P_2$, $P_3$, ...) for each item ($O_1$, $O_2$, $O_3$, ...) and determining dimensions of the virtual parallelepiped,
   l) calculating a surface area of each face (F) of the virtual parallelepiped ($P_1$, $P_2$, $P_3$, ...) and determining faces (F) having surface areas that are greater than said minimum threshold ($S_m$),
   m) determining a random order of introduction of said virtual parallelepipeds ($P_1$, $P_2$, $P_3$, ...)
   n) determining, by randomized iteration, a salient point (T) of each box (B) coinciding with a salient point (T) of each virtual parallelepiped ($P_1$, $P_2$, $P_3$, ...), wherein the contact surface area ($S_c$) and two vertical faces ($F_1$, $F_2$) of a corresponding virtual parallelepiped ($P_1$) contact a parallelepiped ($P_2$) next to the corresponding virtual parallelepiped or the inner surface ($S_i$) of the box (B),
   wherein said step h) further comprises a substep o) of calculating an index of adhesion of the virtual parallelepiped (P) to the box (B), and
   wherein said index of adhesion is obtained by calculating a maximum value of a weighted sum of the contact surface area ($S_c$) of said virtual parallelepiped (P).

2. The method as claimed in claim 1, wherein step h) further comprises the substeps of:
   p) iteratively simulating an introduction of each of the virtual parallelepipeds ($P_1$, $P_2$, $P_3$, ...) into the box (B) based on different possible orders of introduction for a number of times with respect to a predetermined parameter,
   q) associating each possible order of introduction with one box (B) having a smallest volume that can contain all the virtual parallelepipeds ($P_1$, $P_2$, $P_3$, ...), and
   r) selecting the order of introduction having virtual parallelepipeds ($P_1$, $P_2$, $P_3$, ...) with a higher index of adhesion.

3. The method as claimed in claim 1, wherein said first algorithm (6) includes a step of $h_1$) assembling at least one additional box ($B_A$) if said order of introduction does not allow introduction of all the items (O) of said first list ($L_1$) into said main box ($B_P$) that has been selected.

4. The method as claimed in claim 3, wherein said first algorithm (6) includes a step of $h_2$) minimizing an overall volume of the items (O) excluded from insertion in said main box ($B_P$) and introducing said items into said at least one additional box ($B_A$).

5. The method as claimed in claim 3, wherein said main box ($B_P$) and said at least one additional box ($B_A$) comprise cubic dimensions having an overall center of gravity displaced toward a bottom thereof.

6. The method as claimed in claim 3, characterized in that it comprises a second optimization algorithm (7) for determining the dimensions of said main housing ($B_P$) and said at least one additional box ($B_A$) that are not part of said second list ($L_2$) and for actuating said mechanical means (2) to assemble the boxes (B).

7. The method as claimed in claim 1, wherein said first set of data (D') comprises three-dimensional dimensions and weight of each item (O) and said second set of data (D″) comprises restrictions to three-dimensional rotation and a restriction to a possibility of placing the items (O) underneath or on top of other items (O).

8. A system (1) for optimized positioning of items (O) of a first list ($L_1$) of items (O) in at least one box (B) of a second list ($L_2$) of boxes (B), said system comprising:
- detection means (8) configured to detect the items (O) of said first list ($L_1$);
- automated assembling means (2) configured to assemble the boxes (B) of said second list ($L_2$);
- automated positioning means (3) configured to position one or more of the items (O) of said first list ($L_1$) in one or more boxes (B) of said second list ($L_2$);
- a microprocessor-based control unit (4) operably connected to said detection means (8), assembling means (2), and positioning means (3), and having a memory unit (5); and
- a computer program product (9) loaded in said memory unit (5) comprising first (6) and second (7) algorithms and code portions adapted to execute a method comprising the steps of:
  a) providing said first list ($L_1$) of items ($O_1$, $O_2$, $O_3$, ...) to be packed;
  b) providing said second list ($L_2$) of boxes ($B_1$, $B_2$, $B_3$, ...) configured to contain one or more of the items (O) of said first list ($L_1$) with an interposition of a filling material (R);
  c) providing a first set of geometric and dimensional data (D′) for each item (O) of said first list ($L_1$);
  d) providing a second set of position restricting data (D″) that restrict positioning of each item in a box (B) of said second list ($L_2$);
  e) providing said assembling means (2) for assembling one or more of the boxes (B) of said second list ($L_2$);
  f) providing positioning means (3) for placing each item ($O_1$, $O_2$, $O_3$, ...) of said first list ($L_1$) in at least one main box ($B_P$) of said second list ($L_2$);
  g) providing said microprocessor-based control unit (4) connected to said positioning means (3) and to said assembling means (2) and having said memory unit (5) in which there is loaded said first algorithm (6) configured to optimize a selection of the at least one of the boxes (B) and a way of introducing the items (O) into the box (B);
  h) applying said first algorithm (6) to select the at least one main box ($B_P$) of the second list ($L_2$), having a minimum size to contain the items (O) of the first list ($L_1$), while minimizing an unoccupied empty space, and to determine an order of introduction, the position and rotation of the items (O) of said first list ($L_1$) in the box (B), that has been selected, according to said first (D′) and said second (D″) sets of data; and
  i) applying said first algorithm (6) for actuating said assembling means (2) to form said at least one main box ($B_P$) and said positioning means (3) for introducing the items (O) of the first list ($L_1$) into the box (B) that has been selected and assembled;
- wherein said step h) comprises a step of j) of calculating, with said first algorithm (6), contact surface areas ($S_c$) of each item (O) with contact surface areas of one or more items next to the item, or with inner surface ($S_i$) of the box (B) to maintain said contact surface area ($S_c$) of each item above a minimum threshold ($S_m$), thereby ensuring stable positioning and reducing a volume of the filling material (R),
- wherein said step j) comprises:
  k) defining a virtual parallelepiped ($P_1$, $P_2$, $P_3$, ...) for each item ($O_1$, $O_2$, $O_3$, ...) and determining dimensions of the virtual parallelepiped,
  l) calculating a surface area of each face (F) of the virtual parallelepiped ($P_1$, $P_2$, $P_3$, ...) and determining faces (F) having surface areas that are greater than said minimum threshold ($S_m$),
  m) determining a random order of introduction of said virtual parallelepipeds ($P_1$, $P_2$, $P_3$, ...),
  n) determining, by randomized iteration, a salient point (T) of each box (B) coinciding with a salient point (T) of each virtual parallelepiped ($P_1$, $P_2$, $P_3$, ...), wherein the contact surface area ($S_c$) and two vertical faces ($F_1$, $F_2$) of a corresponding virtual parallelepiped ($P_1$) contact a parallelepiped ($P_2$) next to the corresponding virtual parallelepiped or the inner surface ($S_i$) of the box (B),
- wherein said step h) further comprises a substep o) of calculating an index of adhesion of the virtual parallelepiped (P) to the box (B), and
- wherein said index of adhesion is obtained by calculating a maximum value of a weighted sum of the contact surface area ($S_c$) of said virtual parallelepiped (P).

9. The system as claimed in claim 8, wherein said computer program product (9) is implemented in C# and is interfaced with said detection means (8), said assembling means (2), and said positioning means (3) by instructions contained in a XML text file.

* * * * *